United States Patent [19]

Oki

[11] Patent Number: 5,742,702
[45] Date of Patent: Apr. 21, 1998

[54] NEURAL NETWORK FOR CHARACTER RECOGNITION AND VERIFICATION

[75] Inventor: Toru Oki, Allendale, N.J.

[73] Assignees: Sony Corporation, Tokyo, Japan; Sony Electronics Inc., Park Ridge, N.J.

[21] Appl. No.: 694,810

[22] Filed: Aug. 9, 1996

Related U.S. Application Data

[63] Continuation of Ser. No. 955,534, Oct. 1, 1992, abandoned.

[51] Int. Cl.$^6$ .................................................. G06K 9/62
[52] U.S. Cl. ............................................ 382/156; 382/309
[58] Field of Search ................................. 382/217, 309, 382/156, 158, 161, 310; 395/21, 27

[56] References Cited

U.S. PATENT DOCUMENTS

| | | | |
|---|---|---|---|
| 3,050,711 | 8/1962 | Harmon | 340/146.3 |
| 3,701,098 | 10/1972 | Acker | 340/146.3 |
| 3,967,243 | 6/1976 | Kawa | 340/146.3 |
| 4,040,009 | 8/1977 | Kadota et al. | 382/38 |
| 4,267,573 | 5/1981 | Chaikin et al. | 364/515 |
| 4,395,699 | 7/1983 | Sternberg | 382/41 |
| 4,491,960 | 1/1985 | Brown | 382/37 |
| 4,748,676 | 5/1988 | Miyagawa et al. | 382/46 |
| 4,893,346 | 1/1990 | Bishop | 382/8 |
| 4,922,543 | 5/1990 | Ahlbom et al. | 382/48 |
| 4,933,872 | 6/1990 | Vandenberg et al. | 364/513 |
| 4,965,725 | 10/1990 | Rutenberg | 382/15 |
| 4,970,819 | 11/1990 | Mayhak | 42/70.01 |
| 4,972,499 | 11/1990 | Kurosawa | 382/38 |
| 5,046,020 | 9/1991 | Filkin | 382/8 |
| 5,048,097 | 9/1991 | Gaborski et al. | 382/14 |
| 5,052,043 | 9/1991 | Gaborski | 382/14 |
| 5,054,094 | 10/1991 | Barski | 382/18 |
| 5,060,276 | 10/1991 | Morris et al. | 382/8 |
| 5,060,278 | 10/1991 | Fukumizu | 382/15 |
| 5,067,164 | 11/1991 | Denker et al. | 382/15 |
| 5,077,805 | 12/1991 | Tan | 382/137 |
| 5,091,965 | 2/1992 | Kobayashi et al. | 382/15 |
| 5,093,899 | 3/1992 | Hiraiwa | 395/23 |
| 5,105,468 | 4/1992 | Guyon et al. | 382/14 |
| 5,119,438 | 6/1992 | Ueda et al. | 382/14 |
| 5,129,039 | 7/1992 | Hiraiwa | 395/24 |
| 5,146,512 | 9/1992 | Weideman et al. | 382/137 |
| 5,157,738 | 10/1992 | Carpenter et al. | 382/15 |
| 5,161,204 | 11/1992 | Hutcheson et al. | 382/16 |
| 5,214,746 | 5/1993 | Fogel et al. | 395/23 |

OTHER PUBLICATIONS

1990 Int'l. Conf. on Acoustics Speech & Signal Processing, vol. 4, pp. 2125–2128, "Chinese Char. Regog. w/Neural Nets Class.", Jeng et al.

Int'l Conf. on Pattern Recognition, pp. 35–40, Jun. 16–21/90, "Handwritten Zip Code Recog. w/Multilayer Networks", Cun et al.

2nd Int'l. Conf. on Artificial Neural Networks, pp. 214–218, 18–20/ Nov. /91, Segmentation & Recog. of Calligraphic Text, Bruyne et al.

IEEE Int'l. Conf. on Neural Nets, pp. 125–132, vol. 1, 24–27/Jul./88, "Invariant Pattern Recog. by Means of Fast Synap. Plast,", Buhmann.

IEEE Int'l. Conf. on Neural Nets, pp. 625–632, vol. 1,24–27/Jul./88, "Dist. Invar. Char. Recog. by Multi–Layer Per.", Khotanzad et al.

Cognex Corp., Board–Level Machine Vision Systems, 2000/3000/4000 Technical Descript., 1990, USA.

(List continued on next page.)

*Primary Examiner*—Michael T. Razavi
*Assistant Examiner*—Jon Chang
*Attorney, Agent, or Firm*—Lise A. Rode, Esq.; Jerry A. Miller

[57] ABSTRACT

A neural network is used to recognize characters from a character set. Based upon the character recognized, a smaller neural network is used for verification of the character recognized. The smaller neural network is trained to recognize only a single character of the set and provides a "yes" or "no" type verification of correct identification of the character.

4 Claims, 10 Drawing Sheets

RECOGNITION

VERIFICATION

OTHER PUBLICATIONS

IJCNN–Int'l. Joint Conf. on Neural Nets, 17–21/Jun./90, pp. 733–738, "Adaptive Input Field Neural Network", M. Asogawa.

Dr. Dobb's Journal, pp. 139–143, "Graphics Programming—Fast Antialiasing", Jun. 1992. Abrash.

Hakim et al. "Cursive Script Ouline Character Recognition with a Recurrent Neural Network Model." IJCNN, vol. 3, Jun. 1992, pp. 711–716.

Cho et al., "Hierarchically Structured Neural Networks for Printed Haugul Character Recognition." Int. Joint Conf. Neural Net., vol. 1, pp. 265–270, Jun. 1990.

Hirai et al. "Position Independent Neuro Pattern Matching and its Application to Handwritten Numerical Character Recognition." Int. Joint Conf. Neural Net. vol. 3, pp. 695–701, Jun. 1990.

Kertesz "Dynamically Connected Neural Network for Character Recognition", Jun. 1992, IEEE IJCNN 676–676.

VERIFICATION

RECOGNITION

FIG. 2

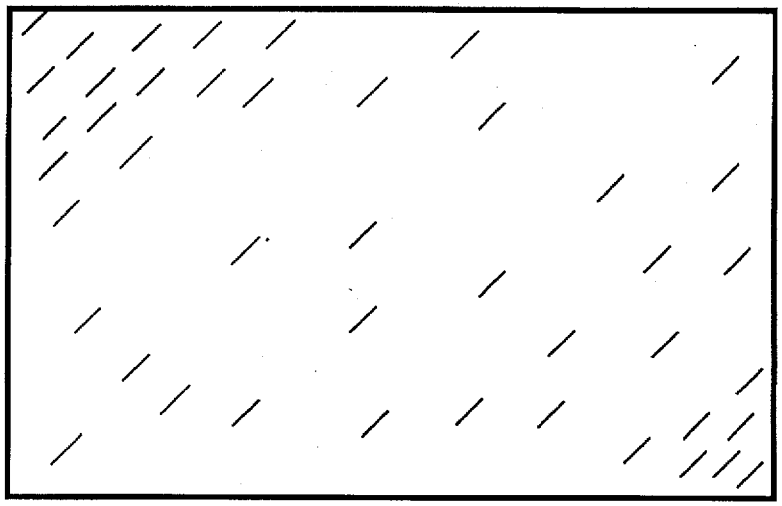
FIG. 5C  W₃(N)
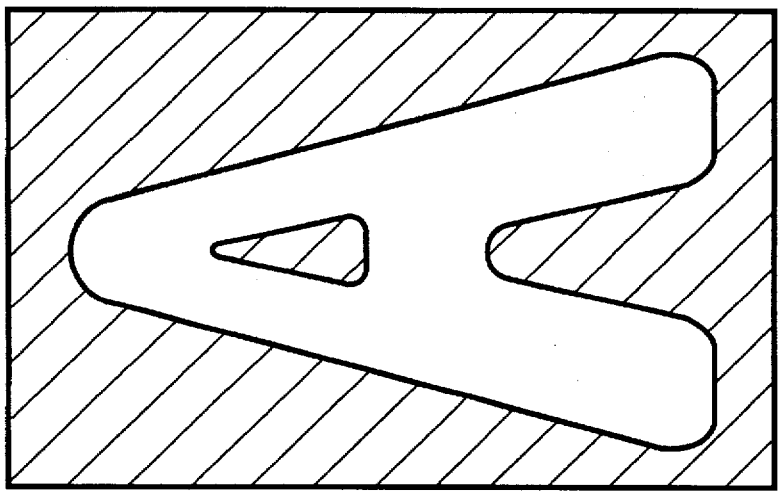
FIG. 5B  W₂(N)
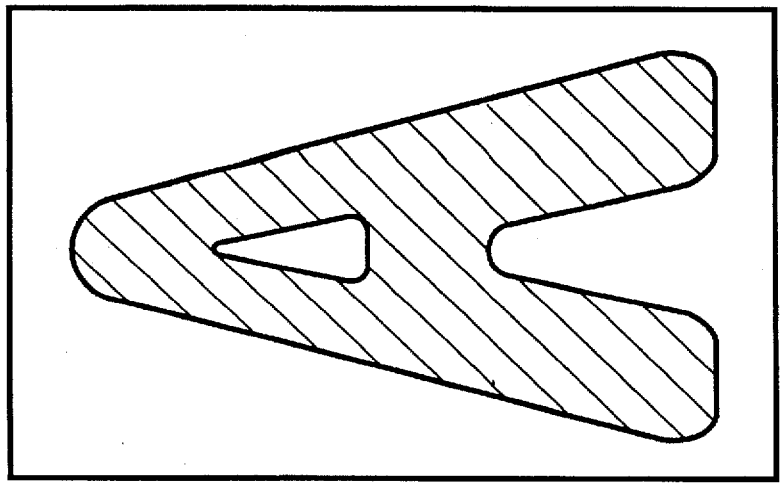
FIG. 5A  W₁(N)

NEURAL NETWORK FOR CHARACTER RECOGNITION AND VERIFICATION

This is a continuation of application Ser. No. 07/955,534 filed on Oct. 1, 1992 now abandoned, which is hereby incorporated by reference.

CROSS REFERENCE TO RELATED DOCUMENTS

This application is related to copending commonly owned applications filed of even date herewith as follows: Ser. No. 07/955,522 entitled "Training Method for Neural Network Using Offset Training Characters", of Toru Oki, Docket Number PA146-92 abandoned; Ser. No. 07/955,556 entitled "Neural Network for Character Recognition of Rotated Characters" of Toru Oki et al, Docket Number PA148-92 now U.S. Pat. No. 5,319,722; Ser. No. 07/955,563 entitled "Training Method for Neural Networks Using Character Width Variation" of Toru Oki, Docket Number PA145-92 abandoned; and Ser. No. 07/955,526 entitled "Training Method for Neural Network" of Toru Oki et al., Docket Number PA150-92, abandoned. These applications are hereby incorporated herein by reference.

BACKGROUND

1. Field of the Invention

This invention relates generally to the field of neural networks. More particularly, this invention relates to a method and apparatus for training a neural network, recognition and verification of symbols or characters from a predetermined set. The invention also utilizes a rotation technique for recognizing characters arranged circularly, but is not limited to such applications.

2. Background of the Invention

Character recognition is an important application of neural networks. Character recognition applications are used for recognition of text in documents as well as recognition of symbols and characters in industrial applications. The present invention is particularly well adapted to machine generated characters. In all applications, optimal accuracy in recognition of the characters is of great importance. Also important is simplicity of the network structure, ease of training, independence of the training on the training sequence used, robustness in the presence of noise, and ability of the network to generalize. An overview and background treatment of the various factors affecting neural network performance and training can be found in a paper entitled "Foundations of Neural Networks" by Patrick K. Simpson, published in *Artificial Neural Networks: Paradigms, Applications and Hardware Implementations*, edited by Sanchez-Sinencio et al., IEEE press, 1992, USA.

In conventional neural networks, both hardware and software, characters are recognized by providing a representation of the character to a neural network. Internal weighting functions are used to weigh the inputs to produce an output representative of the most likely character based upon a training process for training the network. Improving the quality of the training process is the subject of a large body of current research and is currently a factor in determining the accuracy with which the neural network can identify the characters. In industrial applications, correct recognition of characters representing, for example, serial numbers can be critical to production control.

In some industrial applications, recognition of characters is not as important as verification that the characters are correct. Consider, for example, a production process for compact disks wherein a serial number representing the program material is imprinted on the disk prior to actual encoding the disk with video, audio or computer data. A system which recognizes the characters might not be as important as one that verifies that each of a large batch of disks bears the correct serial number. Otherwise, a compact disk which has been imprinted with a label and serial number might be encoded with conflicting program material (e.g. an artist's music might be encoded on a disk with an incorrect label).

The present invention improves the accuracy, convergence and generalizing ability of a character or symbol recognition system by providing a subsequent verification of the character or symbol and a training technique for the verification networks. Moreover, this invention can be used to provide a rapid and simple verification of serial number or similar data. In addition, the training of the verification network can be enhanced using the training techniques of the present invention.

SUMMARY OF THE INVENTION

It is an object of the present invention to provide an improved character or symbol recognition method and apparatus having improved accuracy.

It is an advantage of the present invention that accuracy of recognition is enhanced.

It is a further object to provide a simple and accurate verification system for verifying serial numbers and similar data.

These and other objects, advantages and features of the invention will become apparent to those skilled in the art upon consideration of the following description of the invention.

According to the present invention, a first neural network is used to recognize characters from a character set. Based upon the character recognized, a smaller neural network is used for verification of the character recognized. The smaller neural network is trained to recognize only a single character of the set and provides a "yes" or "no" type verification of correct identification of the character.

In one embodiment of the invention, a method for processing a symbol from a symbol set of N possible symbols, includes the steps of: receiving a representation of the symbol as an input to a recognition neural network; processing the input in the neural network to produce an output representing a recognized one of the N symbols; selecting a verification neural network associated with the recognized one of the N symbols, the verification neural network having an output indicative of either a verification pass or fail; and applying the representation of the symbol as an input to the verification neural network.

Another method for verifying a predetermined symbol, includes the steps of: selecting a verification neural network associated with the symbol, the verification neural network having an output indicative of either a verification pass or fail; receiving a representation of the symbol as an input to a recognition neural network; and applying the representation of the symbol as an input to the verification neural network.

According to another aspect of the invention, a method for processing information representing a symbol selected from a set of symbols, includes the steps of: receiving the information representing a symbol of the set of symbols; analyzing the symbol using a neural network trained to recognize a single symbol of the set; and providing an output of the neural network indicative that the symbol either is or is not the single symbol which the neural network is trained to recognize.

In another aspect of the invention a method of recognizing characters from a set of N characters, includes the steps of: providing a plurality of N neural networks, each neural network being associated with and trained to recognize a single respective one of the N characters and to provide an output indicative thereof; applying an input to each of the N neural networks; and determining which of the N neural networks has an output indicative of recognition of its associated character.

A character recognition and verification system for recognizing characters from a set of N possible characters, according to the invention includes an input source for generating an input representative of a character to be recognized. A recognition neural network recognizes the character as one of the N possible characters. A plurality of N verification neural networks with each of the N neural networks being associated with one of the N characters is trained to recognize its associated character. One of the plurality of N verification neural networks is selected to receive the input representative of the character to be recognized based upon the recognized character.

Another process for character recognition, includes the steps of: recognizing a character using a first neural network; and verifying correct recognition of the character by the first neural network using a second neural network.

Another method for processing a symbol from a symbol set of N possible symbols, includes the steps of: receiving an output of a video camera; digitizing the output of the video camera to produce an array P(K) of digital pixel values as a representation of the symbol as an input to a recognition neural network; processing the input in the neural network to produce an output representing a recognized one of the N symbols; and training a verification neural network being associated with the recognized one of the N symbols to have an output indicative of either a verification pass or fail.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

BRIEF DESCRIPTION OF THE DRAWINGS

FIG. 2 represents an array of pixels making up an example letter "A".

FIG. 5 illustrates the weighting function initialization of the network of FIG. 4.

DETAILED DESCRIPTION OF THE INVENTION

Figure 1B:
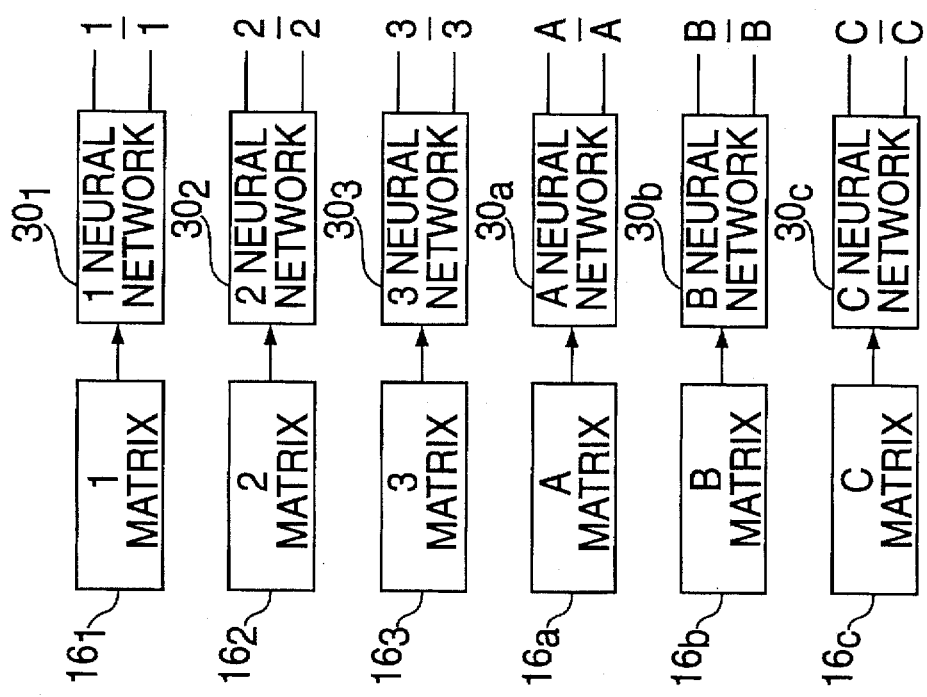
FIG. 1 is a block diagram illustrating the operation of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. For purposes of the present description, the term symbol and character will be used somewhat interchangeably with each intended to represent a member of a set of recognizable set members such as numbers, letters, graphic symbols, alphabet symbols or the like. These terms are also intended to embrace images useful in industrial applications such as and image of a gear, integrated circuit chip, a part or subassembly etc. or any other image or pattern which can be usefully recognized by a neural network.

Figure 1A:
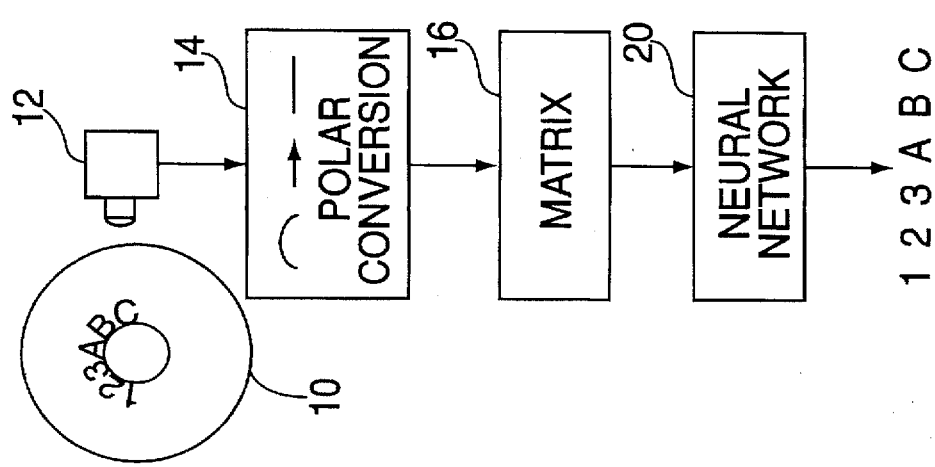

Turning now to FIG. 1, an example industrial application of the present invention is presented. Such an application might be used to recognize a serial number on a part, such as for example, a silicon wafer, circuit board, subassembly, compact disk, etc. Of course, other applications are possible. In this example, assume that a six digit serial number is to be recognized from a part 10, which in the preferred embodiments might be a compact disk or a silicon wafer for semiconductor manufacture. This part 10 is viewed in a particular location by a video camera or other scanning device 12.

Figure 2:
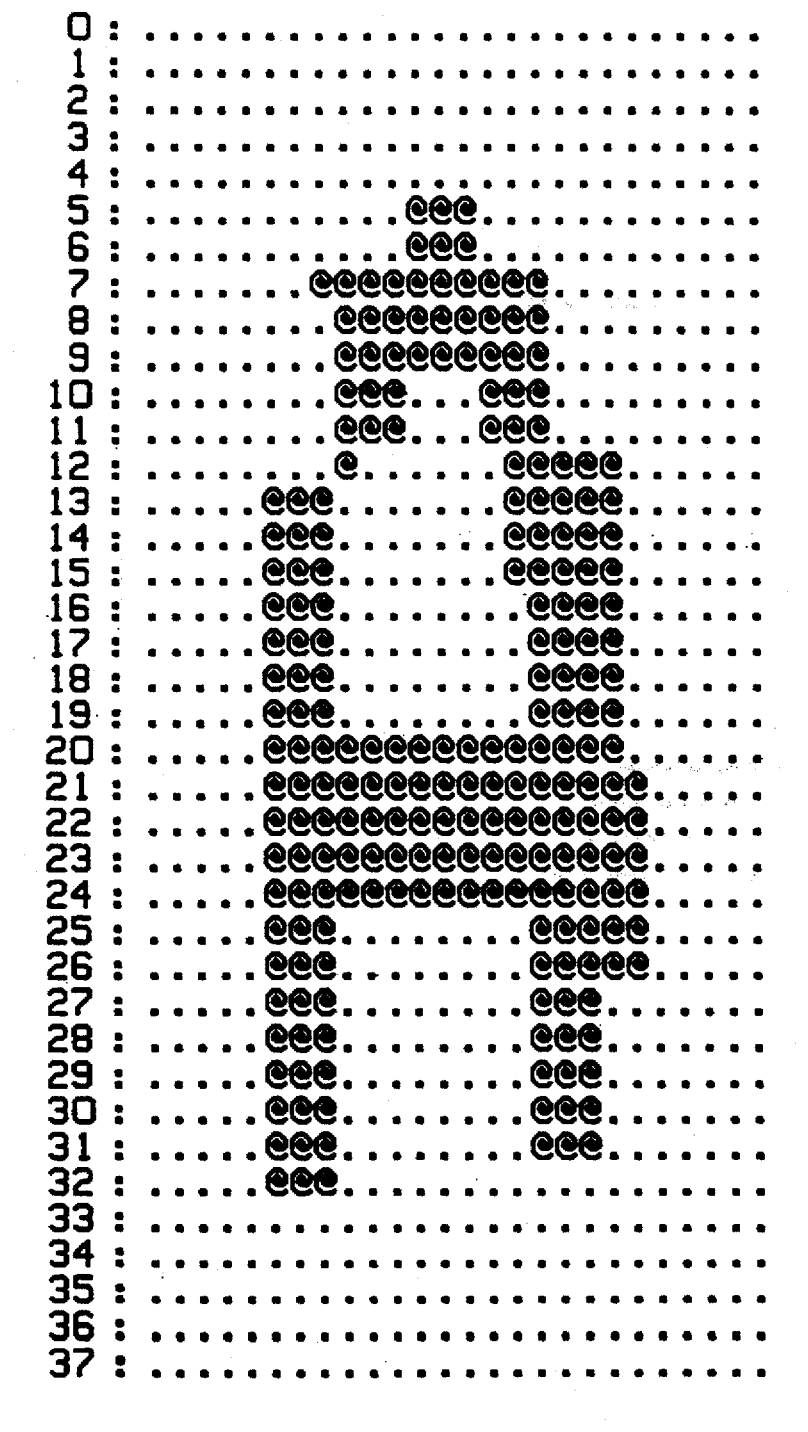

In the case where part 10 is a compact disk, the serial number encircles the central aperture of the disk. This makes recognition of the characters somewhat more difficult. The output of the camera 12 is processed by a polar converter 14 so that the arrangement of the characters is converted from the circular arrangement around the central aperture into a linear segmented sequence of characters as described more fully in the above related application (PA148-92) which is incorporated by reference. Regardless of whether or not the image is circularly arranged, the segmentation and centering process described in the above application is used to improve the performance of the recognition and verification systems. The linear sequence of characters is then represented as a matrix or array 14 (or collection of matrices or arrays) representing each of the characters in a known manner. Typically, the matrix is made up of pixel values which represent the character being viewed. For example, consider a representation of the character "A" as shown in FIG. 2. In this representation, generated from an actual character as processed by the present invention, bright pixels are represented by "@" and dark images are represented by small dots. The row numbers are added for convenience. This character is represented in a computer file by a one dimensional pixel array P(K) of values described by the following (row number added for convenience):

| ROW | |
|---|---|
| 0 | 000000000000000000000000 |
| 1 | 000000000000000000000000 |
| 2 | 000000000000000000000000 |
| 3 | 000000000000000000000000 |

-continued

| ROW | |
|---|---|
| 4  | 00000000000000000000000000 |
| 5  | 00000000000111000000000000 |
| 6  | 00000000000111000000000000 |
| 7  | 00000001111111111000000000 |
| 8  | 00000000111111111000000000 |
| 9  | 00000000111111111000000000 |
| 10 | 00000000111000111000000000 |
| 11 | 00000000111000111000000000 |
| 12 | 00000000100000011111000000 |
| 13 | 00000111000000011111000000 |
| 14 | 00000111000000011111000000 |
| 15 | 00000111000000011111000000 |
| 16 | 00000111000000001111000000 |
| 17 | 00000111000000001111000000 |
| 18 | 00000111000000001111000000 |
| 19 | 00000111000000001111000000 |
| 20 | 00000111111111111111000000 |
| 21 | 00000111111111111111100000 |
| 22 | 00000111111111111111100000 |
| 23 | 00000111111111111111100000 |
| 24 | 00000111111111111111100000 |
| 25 | 00000111000000001111100000 |
| 26 | 00000111000000001111100000 |
| 27 | 00000111000000001110000000 |
| 28 | 00000111000000001110000000 |
| 29 | 00000111000000001110000000 |
| 30 | 00000111000000001110000000 |
| 31 | 00000111000000001110000000 |
| 32 | 00000111000000000000000000 |
| 33 | 00000000000000000000000000 |
| 34 | 00000000000000000000000000 |
| 35 | 00000000000000000000000000 |
| 36 | 00000000000000000000000000 |
| 37 | 00000000000000000000000000 |

In the array above, arranged as 38 rows of 26 bits per row, P(1) appears in the upper left corner, P(2) is immediately to the right of P(1) and so on until P(988) in the bottom right hand corner. Although the present invention binarizes the pixel values to either a 1 or a 0, neural networks can also operate on analog values representing brightness of the pixels or other appropriate characteristics.

The matrix 14, as represented by a plurality of arrays P, is used as an input to a more or less conventional neural network 20 which is trained to recognize each of the characters or symbols from a predetermined character or symbol set (e.g., the alphabet and digits 0–9).

Figure 3:
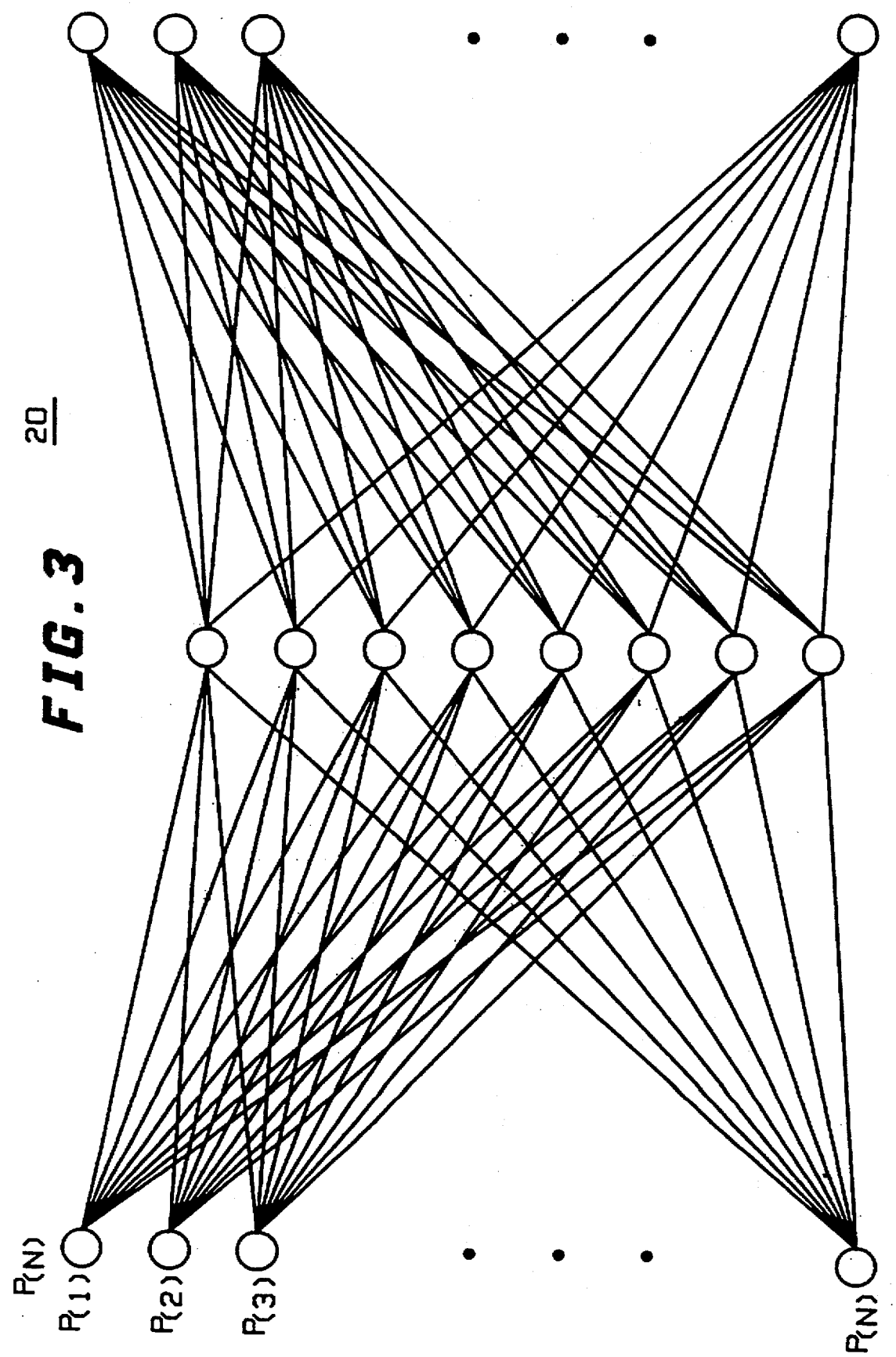
FIG. 3 is a representation of the neural network 20 of FIG. 1.

The neural network 20 of a test embodiment is shown in FIG. 3 and has 988 pixels (K=988) represented by an array of 988 pixels such as array P(K) as above. Each of the pixels is assigned a separate weight in the neural network and is coupled to each of eight intermediate nodes each having a weight associated therewith. The intermediate nodes are each connected to an output node. In the present embodiment, fourteen such output nodes are used so that any of fourteen characters can be recognized. Conventional back propagation or other training techniques can be used for training this network 20. In the example shown, each character in the serial number is sequentially analyzed by the neural network 20 to produce a sequence of, for example, six characters making up a serial number. In the preferred embodiment, an eleven character serial number is recognized by sequentially applying eleven arrays P(K) to the neural network 20.

Referring back to FIG. 1, if the characters are correctly recognized by the network 20, the correct serial number is output. This output is then verified by a second set of neural networks as follows:

The serial number output from the neural network 20 as shown in the example of FIG. 1 is a six character code. Of course, in general any number of characters could be processed. To verify the serial number in this example, a recognition neural network 30 ($30_1$, $30_2$, $30_3$, $30_a$, $30_b$, $30_c$) is selected corresponding to each of the six characters of the serial number. Each such neural network is then provided with matrix $16_1$, $16_2$, $16_3$, $16_a$, $16_b$, $16_c$ for analysis. Matrix $16_1$ contains the representation for the character "1" held in matrix 16. Matrices $16_2$, $16_3$, $16_a$, $16_b$, $16_c$ similarly contain the representations for characters "2", "3", "a", "b" and "c" from matrix 16. Thus, if a character or symbol set has N characters or symbols, N such neural networks are made available for selection.

Each of these neural networks 30 can be substantially less complex than the neural network 20 and each is trained to recognize a single member of the character or symbol set. That is, each neural networks 30 is trained to recognize only a single character and not that character. Thus, network $30_b$ is trained to give a "yes" or "no" answer to whether the character being analyzed is a letter "b". To do so, the network is taught that "b" is the correct answer if the input is an image of the letter "b", and that "not b" is the correct answer if the input is an image of "a", "c"–"z", or "0"–"9". Thus, the output of network $30_b$ is either "b" or "not b". (Those skilled in the art will appreciate that the output of the neural networks are not pure binary, but rather, the output which is greatest controls.) Of course, an equivalent binary output can be generated wherein, for example, a "1" output represents verification of a particular character and a "0" output represents non-verification of the particular character.

If the network properly verifies each of the characters, the serial number can be presumed to have been correctly recognized with a high degree of confidence. If one or more of the symbols from the serial number are not verified, other steps can be taken to provide error recovery. Since the neural networks 30 are small, and the training is very specific to a single character, processing speed is very fast and the reliability is high.

Figure 4:
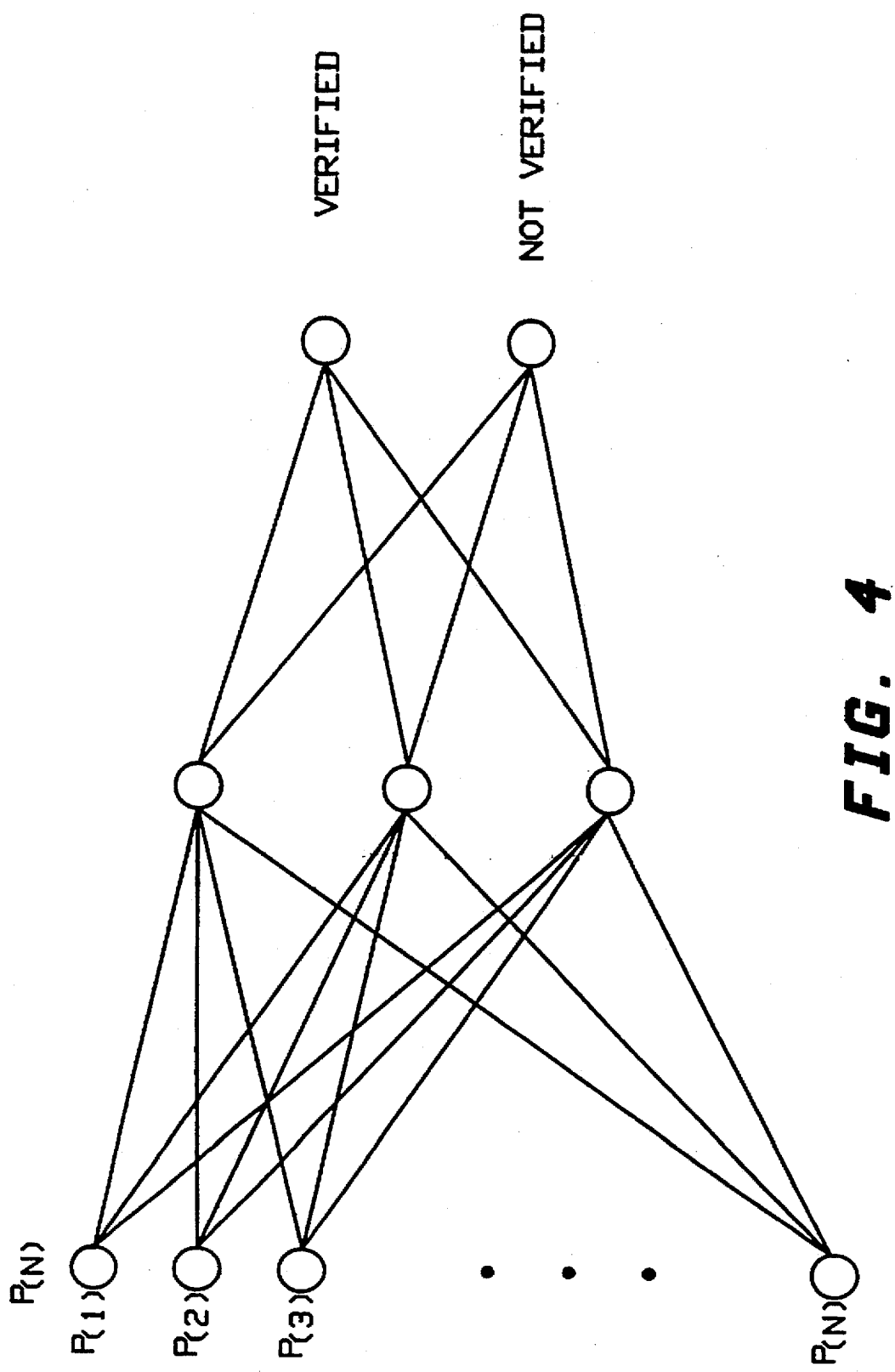
FIG. 4 is a representation of the neural networks 30 of FIG. 1.

FIG. 4 shows an example of a neural network 30 structure used in testing the present invention. This structure accepts the same 988 pixel array P(K) as network 20. These pixels are weighted and applied to an intermediate set of nodes having only two or three intermediate nodes (three are shown in FIG. 4). Weights for these intermediate nodes are used to produce outputs to two output nodes indicating that the character associated with this network is either verified or not verified. This network is simple, fast and comparatively easy to implement.

Depending upon the character to be verified by neural network 30, either two or three intermediate (hidden) nodes can be used when the network weights are initialized as will be described later. FIG. 4 shows three nodes, but many characters which do not exhibit excessive overlap with other characters can be verified with only two intermediate nodes. Those characters requiring three nodes, in general, do not readily converge with the training technique to be described when only two intermediate nodes are used. Characters requiring three nodes can be determined experimentally. With experience, such characters can be determined by inspection. However, the process could be automated, for example by use of a dot product of all possible character combinations. Character pairs with a dot product exceeding a predetermined threshold (determined experimentally) could then be verified with a neural network having three intermediate nodes. A test character set having the characters 0–9, A, R, O and @ was used for testing the present invention. Of these, verification networks were constructed for a subset of 1, 2, 4, 7, @, 0 and A. In this subset, three intermediate nodes were used only for the characters A, 0 and @.

A special training technique has been devised for these verification networks and is illustrated in FIG. 5 for a network trained to recognize the character "A". In this example, recall that there are three sets of weights associated with the inputs of the three intermediate nodes. These weights can be thought of as arrays $W_1(K)$, $W_2(K)$ and $W_3(K)$. In the example illustrated previously, K=988 since there are 988 pixels applied as inputs to the networks. Thus, there is a one to one correspondence between the input array P(K) and the weighting arrays $W_1(K)$, $W_2(K)$ and $W_3(K)$.

It has been determined that improved training speed can be obtained with enhanced accuracy by strategically initializing (pre-loading) the weighting arrays prior to using a conventional back propagation training process or the like. In the present case where three intermediate nodes are used and the network has only to recognize two outputs, the weighting functions are selected as follows:

$$W_1(K) = \left\{ \begin{array}{ll} \text{Large,} & \text{if } P(K) = 1 \\ \text{Small,} & \text{if } P(K) = 0 \end{array} \right\}$$

$$W_2(K) = \left\{ \begin{array}{ll} \text{Small,} & \text{if } P(K) = 1 \\ \text{Large,} & \text{if } P(K) = 0 \end{array} \right\}$$

$$W_3(K) = \text{Random Noise}$$

where P(K) is an input array containing an ideal representation of the character to be verified. That is, the weighting functions are pre-loaded with a pattern resembling an ideal input array.

In the preferred embodiment, the weighting function for the first tap $W_1(K)$ is selected to be a pattern which is highly correlated with an ideal input character. In fact, the correlation between $W_1(K)$ and P(K) is 1.0 when P(K) contains an ideal representation of the character which the network is being trained to recognize. Thus, this node "fires" heavily (produces a large output) when a character close to ideal is applied to the input. The second weighting function $W_2(K)$ is selected to be the additive inverse of $W_1(K)$ so that it is highly uncorrelated with $W_1(K)$ and with P(K) when P(K) contains an ideal representation of the character which the network is being trained to recognize. In this case the correlation is 0.0. Thus, the second node heavily inhibits firing (produces a small output) when a character close to ideal is applied as an input. This second node therefore rejects the ideal character. After training, of course, the weight values will be modified.

In this example (three hidden nodes) the third node, which is initialized with random noise, is added to provide a large enough weight space to achieve linear separability (the ability for networks to create sub-classes on the hidden nodes for proper convergence) when convergence cannot be obtained (or easily obtained) with two nodes. In other words, the third node provides the network with extra weights which help to distinguish between characters exhibiting substantial similarities (e.g. 0 and O and @, 8 and 3 and B, etc.). It is anticipated that if the number of characters which are to be recognized and distinguished is increased, more hidden nodes may be needed to achieve linear separability by further enlarging the weight space.

If the weighting arrays are arranged in a 38×26 matrix similar to that shown in FIG. 2, with larger weight values represented as shaded regions and smaller weights represented by clear regions, the above equations would appear something like the three arrays loosely illustrated in FIG. 5. The allowable range of weight values of a test embodiment were initially floating point numbers ranging from −3.2768 to +3.2768. A value of +0.3 was used as a large value and a value of −0.3 was used for small values to produce the best results of the values tried and permit the weights to fluctuate in value both up and down. Of course, further optimization is possible. Weight values ranging from ±0.1 to ±0.5 were tested successfully as values suitable for initialization of the tap weights. When ±0.5 was used, results were perceived to be only slightly poorer than when ±0.3 was used as large and small weight values. Convergence wa somewhat slower when ±0.1 was used as initial large and small weight values. $W_3(K)$ was initialized with random noise having an even distribution in the range of +0.3 to −0.3.

These weight values are somewhat specific to the embodiment shown, however the technique should be generally applicable when the weight values are scaled for the system at hand. In this case, good results were obtained when large and small values are defined to be approximately the upper and lower 10% points of the dynamic range provided for tap values, but a relatively wide range of values could be expected to function. In general, "large" weights are large relative to "small" tap weights.

After initializing these weights, conventional back propagation was used with a plurality of passes of the character set as input. The character set was sequentially applied to the input in order with the character to be recognized interleaved with other character set members (e.g. A, B, A, C, A, D, . . . ,A, Z, A, B, . . . ,Z, . . . rather than A, A, A, A, B, B, . . . , Z when training the network to recognize "A"). In the experiments conducted on these networks, it was desired to reduce the dependency of the network on the training sequence and to provide the network with the ability to generalize (recognize characters which are similar to the characters used in training. e.g., corrupted in some way so that they are not identical to those in the training sequence). The use of the above technique for initializing the tap weights achieved rapid convergence of the weights and reduced the dependency of the network on the training sequence.

A further refinement to the training process was used to achieve generality of the network. In this technique, illustrated in FIG. 7, the network was first trained for a period of time using an ideal character set as a training sequence. After a period of time, the network was trained using an offsetting of the characters in the character set. In the tests conducted, 500 repetitions (cycles) of the sequence were used prior to offsetting. Then 1000 repetitions were used with offset added. Offset is not required to make the network converge, but it is important to note that convergence alone does not assure that the network will work properly for data which is not in the training set. The use of the present offset technique helps the network to generalize so that it is better able to recognize patterns which are not part of the training sequence. The present offset process has an additional benefit. Stray pixels on the edge of a character can cause the center of the character to shift. Offset during training simulates this shift and creates a network which is robust to such noise.

Figure 6A:
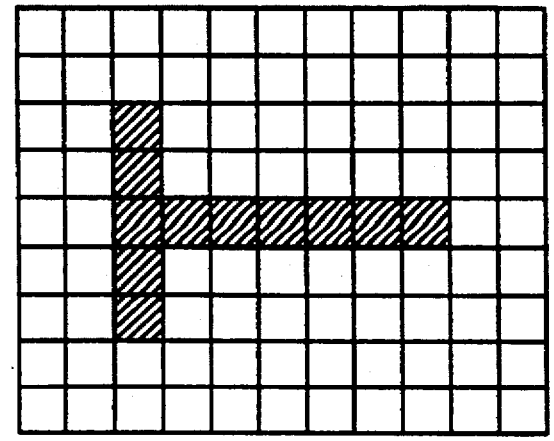
FIG. 6 illustrates the character offsetting used in the training process.
Figure 6B:
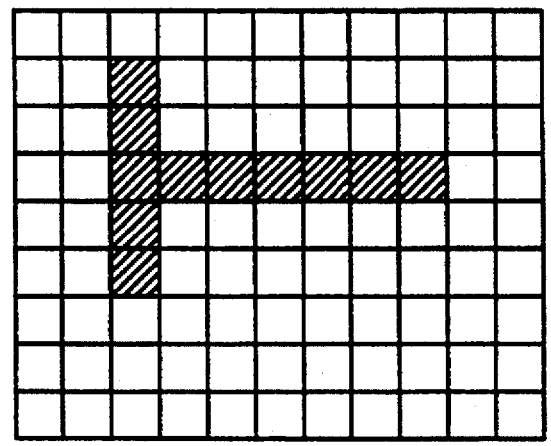
Figure 6C:
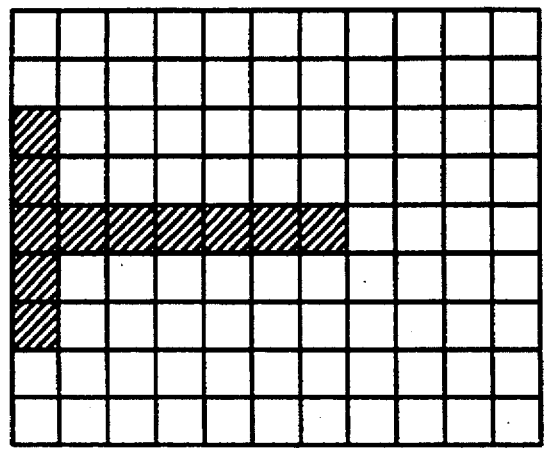

The offsetting process is illustrated in FIG. 6 with an example character "T". In FIG. 6A, the standard ideal character "T" is illustrated centered in a "character window". To achieve the desired generality, the character is shifted in the learning process by some number of pixels up, down, left or right. In FIG. 6B, the character has been offset by 1 pixel to the right. In FIG. 6C, the character has been offset by 2 pixels up. In test networks, a random offset was added in each repetition of the sequence. The offset could be as many as two pixels in any direction. So, a given repetition could be shifted (up 1, left 2), (down 0, right 1), (down 2, up 2), etc. The offset is changed randomly at each character of the training sequence for each repetition. Those skilled in the art will appreciate that some improvement in convergence might be expected if the offset were only applied to the character which was to be verified by the network. Other variations such as the number of pixels of offset and techniques for varying the offset will occur to those skilled in the art.

Figure 7:
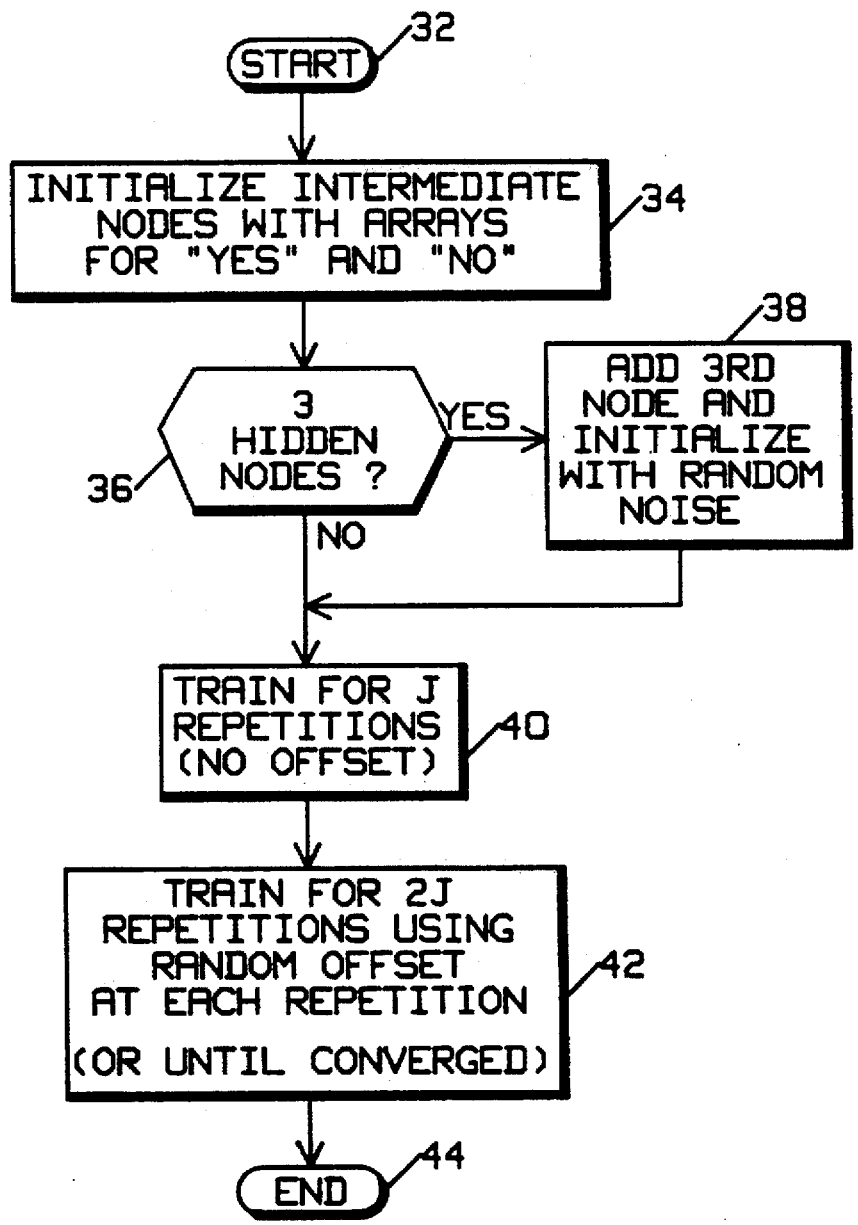
FIG. 7 is a flow chart of the training process of the present invention.

This training process is described in FIG. 7 starting at step 32. At step 34, two intermediate nodes (which can be considered "yes" and "no" nodes) are initialized with arrays correlating with the character to be recognized. One node is initialized with an array with large value weights at each pixel in the character for which the network is being trained and small values for the remaining pixels. This can be considered the "yes" node. The other node (the "no" node) is initialized with an array opposite that of the "yes" node (i.e., the additive inverse). The "yes" node will accumulate high values when the correct character is applied as an input and the "no" node will accumulate low values when the correct character is applied as an input.

At step 36, if the character is linearly inseparable from another character in the character set, a third node is used. At step 38, this node is initialized with random noise in a conventional manner. In either event, a training sequence containing all of the characters in the character set is applied at step 40 for a number of repetitions J. Depending on the circumstances, J can be experimentally optimized. In test networks, about 500 repetitions for J was found satisfactory. After J repetitions, the offsetting process is introduced wherein up to two pixels of random offset in any random direction is added during each repetition thereafter. About twice as many repetitions as in step 42 (about 1000 in the tests) was found satisfactory to achieve convergence and generality. The training ends at 44 after the prescribed number of repetitions or when convergence is achieved.

Once the values of the weights are determined by training, it is desirable to eliminate use of floating point computations since they require much greater computation time. To speed computation the final weights actually used are converted to sixteen bit integer values by scaling. Thus, a maximum tap weight of $-3.2768$ is represented as $-32768$ ($-2^{15}$ and a tap weight of $+3.2768$ is represented as $+32768$ ($+2^{15}$). Weights between these extremes are scaled accordingly. The initial maximum and minimum values of the weights were selected to simplify the conversion to a 16 bit integer by simply multiplying 10,000 (shifting the decimal place for places to the right and converting to integer). Other minimum or maximum values could be selected without departing from the invention.

Figure 8:
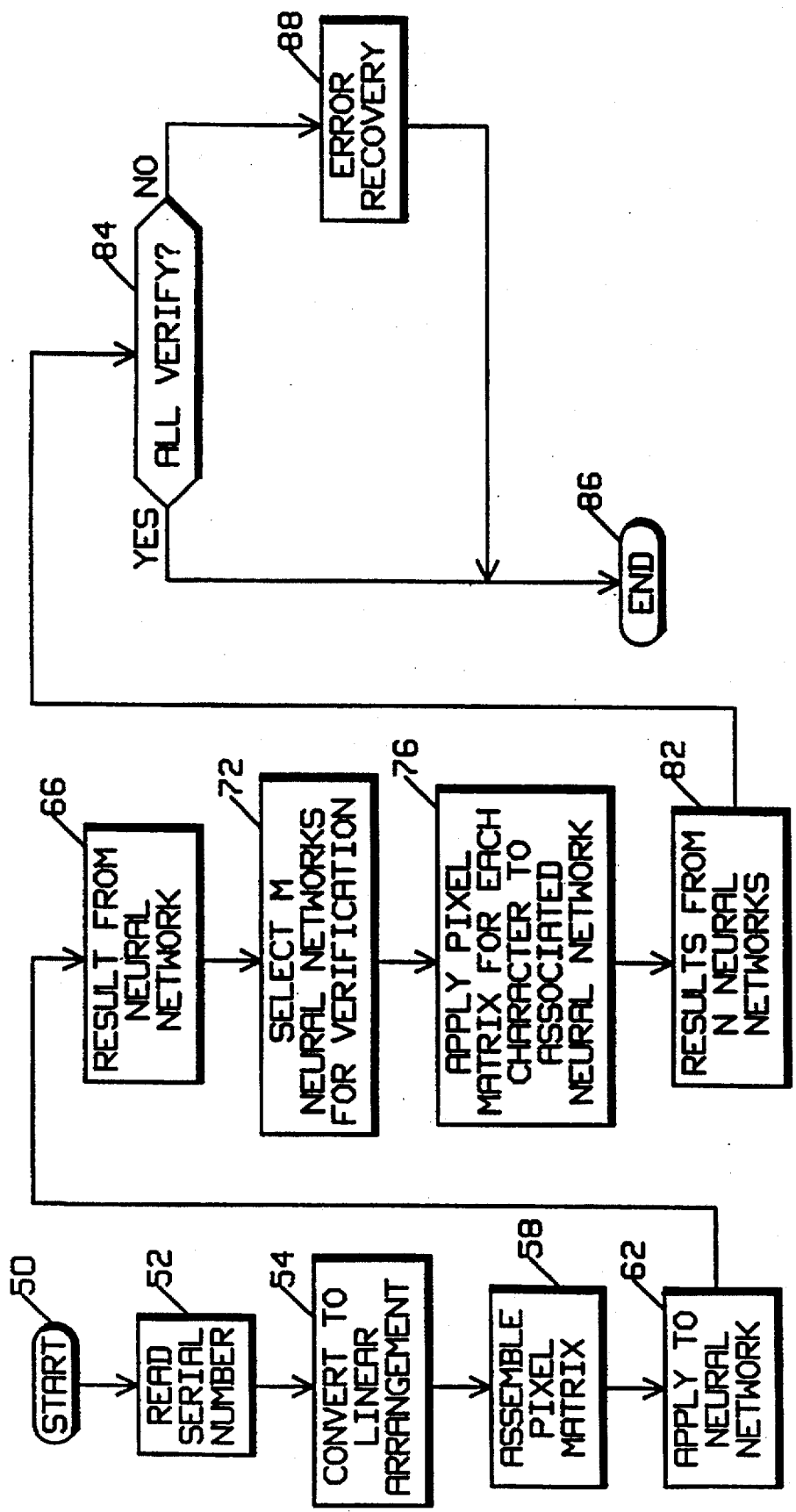
FIG. 8 is a flow chart of the operation of the present invention.

Turning now to FIG. 8, the present recognition and verification process is summarized in the form of a flow chart starting at step 50. At step 52 the serial number is scanned from part 10 to create an image representation usable by a computer or neural network circuit. Recall that for the preferred embodiment, the serial number is arranged in a semicircle around the center aperture of a compact disk. At step 54, the image is manipulated to convert the semicircular character arrangement into a linear arrangement such as that of FIG. 2 by rotating each character to a more readily readable arrangement as described in the copending application docket number PA148-92, Ser. No. 07/955,555.

At step 58, a matrix is assembled containing the rotated characters. In general, it is desirable to isolate each character at this point into a separate matrix of pixels for processing. This matrix is then applied to a neural network at step 62, which is trained to recognize the members of an appropriate set of N characters or symbols. The neural network then produces a result at step 66 containing the network's best estimation of the value of each of the M characters or symbols of the serial number.

At step 72, a set of M smaller neural networks, one for each recognized symbol of the serial number, is selected from a collection of N such neural networks. Each of the N neural networks is trained to give only a "yes" or "no" answer in recognition of a single one of the N characters in the total character set. Each of the N neural networks is thus associated with recognition of a single character in the set.

At step 76, each of the individual matrices associated with a character in the serial number is associated with one of the M neural networks selected in step 72 so that the character image as represented by the pixel matrix for each character of the serial number is applied to a verification neural network associated with each recognized character from step 66. Each of the smaller M neural networks then analyzes the individual characters and provides a result at step 82 indicative of whether or not each character is believed to be correctly recognized. If all M characters of the serial number are correctly recognized at step 84, the process ends at 86. If all characters cannot be verified at step 84, an error recovery procedure can be instituted at step 88 prior to ending at 86.

Figure 9:
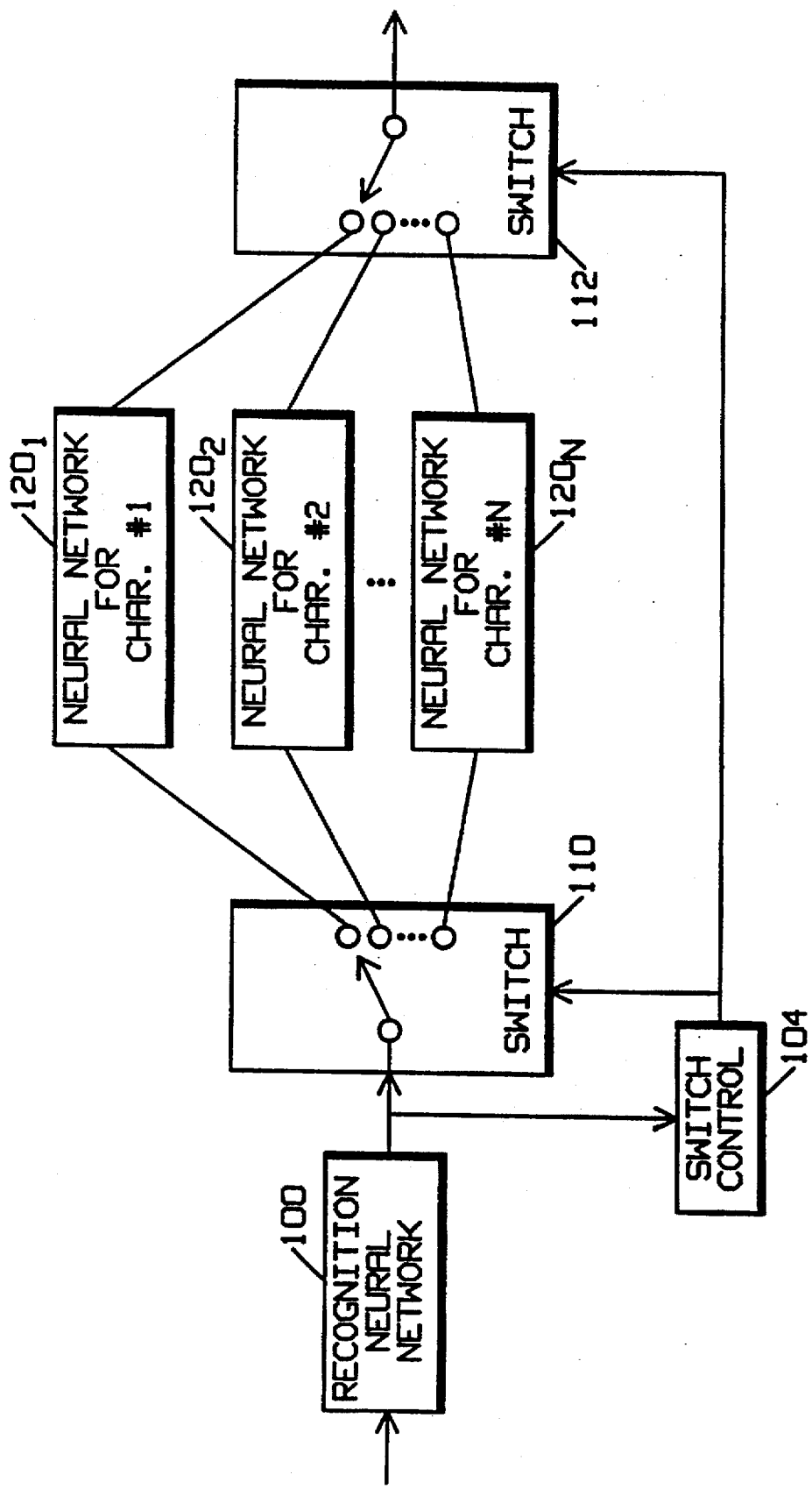
FIG. 9 is a block diagram of a character recognition and verification system of the present invention.

Referring to FIG. 9, an embodiment of a character recognition system according to the present invention is represented in block diagram form. In this system, a first neural network 100, or other network designed for character recognition, is used to initially recognize characters, an image of which is supplied to its input. Those skilled in the art will understand that the recognition process of 100 could also be manual reading and entry, or recognition followed by multiple verifications of the same serial number. In industrial applications, it is frequently the case that the recognition portion is only used once initially. Then the verification portion is used repeatedly for a plurality of parts which are verified. The output of network 100 is read at a switch control 104 which determines a position of switches 110 and 112 to select one of N character verification neural networks $120_1$ thorough $120_M$. In the case of manual or other recognition of the characters in 100, the switching represented by switches 110 and 112 could also be implemented manually. Of course, other embodiments are possible without departing from the invention.

Figure 10:
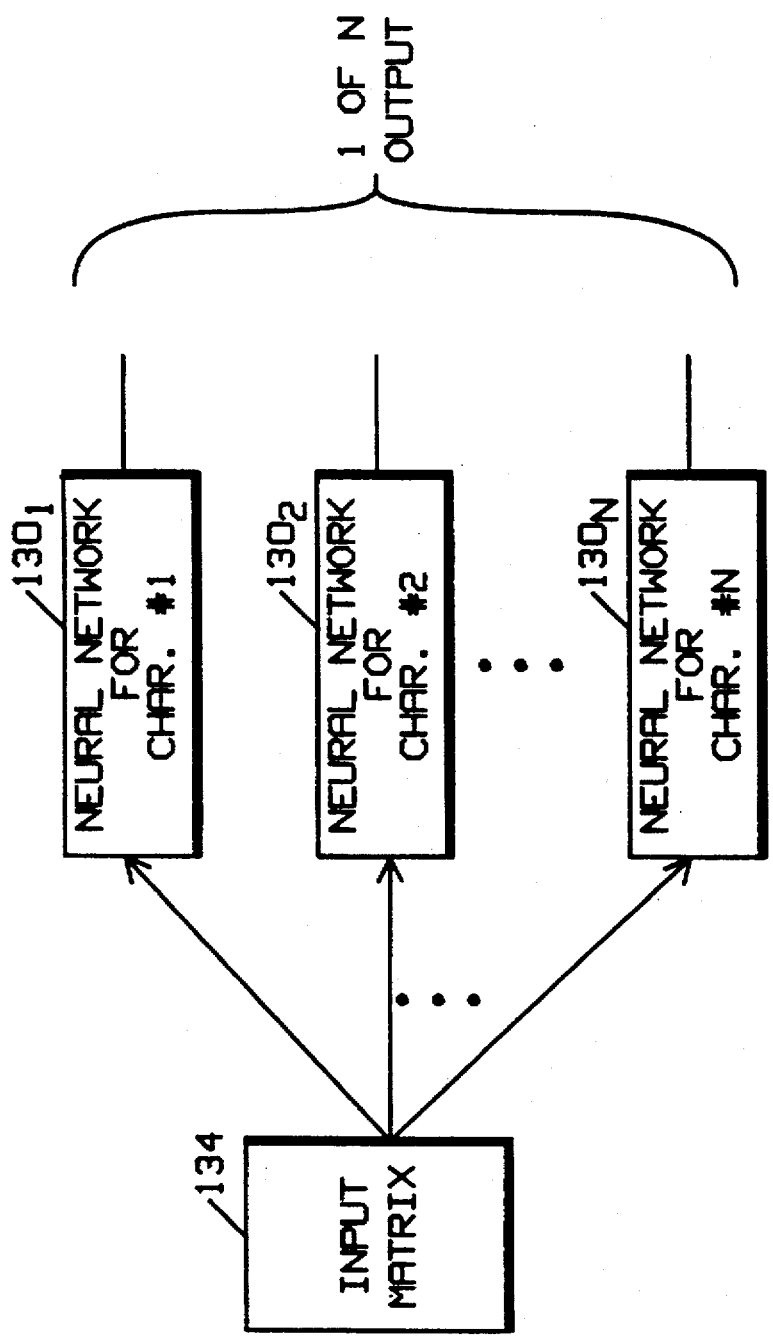
FIG. 10 is a block diagram of a character recognition system according to an alternative embodiment of the present invention.

While the preferred embodiment of the present invention, as described above, utilizes a plurality of smaller neural networks in a verification capacity, it is also contemplated that an array of such small neural networks can be used for character recognition. In a software embodiment, this can be implemented either with sequential or parallel processing. In a hardware embodiment, parallel connected neural network chips can be used to achieve rapid processing. This variation is illustrated in FIG. 10 wherein a character set of N characters would use a set of N small neural networks $130_1$ through $130_N$ receiving an input such as from input matrix 134. The N neural networks provide a 1-of-N output identifying the character or symbol.

Many variations of the present invention are possible. For example, although the current embodiment of the neural networks is implemented on a digital computer in the form of a computer program, hardware implementations are also possible and likely as the availability and cost of neural network circuits becomes more attractive. The present techniques are described in conjunction with three layer neural networks, but are generally applicable to networks with three or more layers. Also, although the present invention has been described in terms of a two step process for first recognizing and then verifying characters or symbols, those skilled in the art will appreciate that the verification process can be used alone in any environment where the characters or symbols are known in advance.

The training process can also be varied considerably without departing from the invention. For example, although a random variation of the offset is described, systematic application of an offset could also be devised. The organization of the training sequence as described is systematic but could be randomized. The weighting functions $W_1(K)$ and $W_2(K)$ could be used independently, one without the other.

The emphasis of the present invention has been on recognition of alphabetical or numerical type characters, but as mentioned previously, industrial applications may require that the object to be recognized is a part to be picked up by a robot, a part outline, a bar code or other image. Although three layer networks are disclosed, the techniques should extend to networks with more layers. Even though the inputs are binary values in the disclosed embodiments, analog or digitized analog inputs are also anticipated. Other variations will occur to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for verifying a plurality of groups of symbols from a symbol set of N possible symbols, comprising the steps of:

(a) providing a plurality of N verification neural networks, each associated with and trained to verify one of N possible symbols wherein each of said N verification neural networks accepts as an input a representation of a symbol associated with each respective N verification neural network and has two output nodes indicating whether the input representation of a symbol is either verified or not verified;

(b) selecting a group of verification neural networks from said plurality of N verification neural networks associated with a group of symbols;

(c) applying representations of one group of symbols as inputs to said group of verification neural networks;

(d) processing said inputs in said verification neural networks; and (e) repeating steps (c) and (d) for each of the plurality of groups of symbols other than said one group, wherein step (e) terminates when any one of said verification neural networks indicates a verification fail.

2. A method for processing a plurality of groups of symbols from a symbol set of N possible symbols, comprising the steps of:

(a) receiving a representation of a group of symbols as inputs to a recognition neural network;

(b) processing said inputs in said recognition neural network one at a time in order to produce outputs representing a group of recognized symbols;

(c) providing a plurality of N verification neural networks, each associated with and trained to verify one of said N possible symbols;

(d) selecting a group from said N verification neural networks associated with each member of said group of recognized symbols, said group from said N verification neural networks having an output indicative of either a verification pass or a verification fail;

(e) applying said representation of said group of symbols as inputs to each respective said verification neural network;

(f) processing said inputs in said verification neural networks;

(g) applying a representation of a group of symbols, which is different from the group applied in step (e), as inputs to said verification neural networks;

(h) processing said inputs in said verification neural networks; and (i) repeating steps (g) and (h) for each remaining group of symbols, terminating when any one of said verification neural networks indicates a verification fail.

3. A method for processing a plurality of groups of symbols from a symbol set of N possible symbols, comprising the steps of:

(a) receiving an output of a video camera;

(b) digitizing said output of the video camera to produce a plurality of arrays P(K) of digital pixel values each representing a member of one group of said plurality of groups of symbols;

(c) applying said representation of said group of symbols as inputs to a recognition neural network;

(d) processing said inputs in said recognition neural network one at a time in order to produce outputs representing a group of recognized symbols;

(e) selecting a group of verification neural networks from said N verification neural networks associated with each member of said recognized group of symbols, said verification neural networks having an output indicative of either a verification pass or fail;

(f) applying representations of said group of symbols as inputs to said group of verification neural networks;

(g) processing said inputs in said selected group of verification neural networks; and (h) repeating steps (a), (b), (f) and (g) for each of the plurality of groups of symbols other than said one group, terminating when any one of said verification neural networks indicates a verification fail.

4. A method for processing a serial number on a surface of a compact disc, comprising the steps of:

(a) receiving a representation of a group of symbols as inputs to a recognition neural network;

(b) processing said inputs in said recognition neural network one at a time in order to produce outputs representing a group of recognized symbols;

(c) providing a plurality of N verification neural networks, each associated with and trained to verify one of said N possible symbols;

(d) selecting a group from said N verification neural networks associated with each member of said group of recognized symbols, said group from said N verification neural networks having an output indicative of either a verification pass or a verification fail;

(e) applying said representation of said group of symbols as inputs to each respective said verification neural network;

(f) processing said inputs in said verification neural networks;

(g) applying a representation of a group of symbols, which is different from the group applied in step (e), as inputs to said verification neural networks;

(h) processing said inputs in said verification neural networks; and (i) repeating steps (g) and (h) for each remaining group of symbols, terminating when any one of said verification neural networks indicates a verification fail.

* * * * *